United States Patent [19]
Covington

[11] Patent Number: 5,284,579
[45] Date of Patent: Feb. 8, 1994

[54] ONE-PIECE ANTI-DRAINBACK AND RELIEF VALVE

[75] Inventor: Edward A. Covington, Gastonia, N.C.

[73] Assignee: Dana Corporation, Toledo, Ohio

[21] Appl. No.: 938,430

[22] Filed: Aug. 31, 1992

[51] Int. Cl.⁵ .............................................. B01D 27/10
[52] U.S. Cl. ................... 210/130; 210/136; 210/444; 210/DIG. 17
[58] Field of Search ............... 210/130, 136, 440, 443, 210/444, DIG. 17

[56] References Cited

U.S. PATENT DOCUMENTS

| | | | |
|---|---|---|---|
| 2,183,616 | 12/1939 | Korte | 210/130 |
| 2,902,162 | 9/1959 | Humbert, Jr. et al. | 210/438 |
| 2,937,756 | 5/1960 | Humbert, Jr. | 210/130 |
| 3,132,097 | 5/1964 | Tietz | 210/130 |
| 3,231,089 | 1/1966 | Thornton | 210/130 |
| 3,235,085 | 2/1966 | Humbert, Jr. | 210/130 |
| 3,243,045 | 3/1966 | Tietz | 210/130 |
| 3,529,722 | 9/1970 | Humbert, Jr. | 210/130 |
| 3,557,957 | 1/1971 | Baldwin | 210/130 |
| 3,785,491 | 1/1974 | Dudinec et al. | 210/130 |
| 4,045,349 | 8/1977 | Humbert, Jr. | 210/232 |
| 4,820,409 | 4/1989 | Lowsky et al. | 210/130 |
| 4,935,127 | 6/1990 | Lowsky et al. | 210/130 |
| 5,053,129 | 10/1991 | Kitson | 210/232 |

Primary Examiner—Matthew O. Savage
Attorney, Agent, or Firm—Marshall & Melhorn

[57] ABSTRACT

A spin-on fluid filter of the type having a hollow, cylindrical filter element enclosed within an outer container and an end plate, is provided with a one-piece, combination anti-drainback and relief valve. The valve includes an axially movable cylindrical sleeve, one end thereof being disposed within the filter element, and the other end thereof normally engaging the end plate radially inwardly of the inlet ports and radially outwardly of the outlet port formed in the end plate. A resilient annular seal extends from the sleeve to normally engage the end plate radially outwardly of the inlet ports. A spring is disposed within the filter element for normally urging the cylindrical sleeve downwardly into engagement with the end plate. The diameters of the end portions of the spring are preferably smaller than the diameter of the central portion thereof.

11 Claims, 4 Drawing Sheets

ONE-PIECE ANTI-DRAINBACK AND RELIEF VALVE

BACKGROUND OF THE INVENTION

1. Field of the Invention

The present invention relates to a fluid filter and, more particularly, to a one-piece, combination anti-drainback and relief valve for a disposable, spin-on oil filter.

2. Summary of Related Art

Spin-on oil filters are well known devices often used in the oil circulation system of internal combustion engines to filter out small particulate matter which would otherwise abrade moving engine parts. These filters generally include a cylindrical outer container and an end plate enclosing a hollow, cylindrical filter element. Plural inlet ports and a central outlet port are provided in the end plate to allow oil to circulate through the filter element. The central outlet port is typically threaded for "spin-on" mounting of the filter to an engine filter mount. An annular gasket is utilized for effecting a seal between the filter and the engine mount or adapter plate on which the filter is mounted.

Such filters are also generally provided with an anti-drainback valve and pressure relief valve. The anti-drainback valve prevents the gravity induced, drainage of oil from the filter which would otherwise occur when the engine is not operating. This feature is desirable since a drained oil filter results in a momentary interruption in the circulation of oil when the engine resumes operation. A pressure relief valve is also generally utilized in this type of filter to permit oil flowing through the filter to bypass the filter element when a predetermined pressure threshold is surpassed due to the build-up of contaminants in the filter element.

In practice, the anti-drainback valve and pressure relief valve have generally consisted of separate elements, adding substantially to the manufacturing cost of the filter. Overall, it is clearly desirable that the manufacturing cost of the valve assemblies for such filters be minimized, since these filters are generally disposable.

Combined anti-drainback and relief valves have been proposed, but have generally required a plurality of elements associated with the valve to achieve the desired operation. The complexity of such valves adds significantly to the cost of both the materials and the assembly thereof, making such filters relatively expensive. A cost-effective one-piece, combination anti-drainback and relief valve which provides effective valve operation and long-term sealing properties has been heretofore unavailable.

In addition, such conventional spin-on oil filters typically include a perforated metal center tube disposed axially within a pleated paper filter element. The perforated center tube laterally supports the filter element, while allowing oil to pass from the filter element down through the center tube and out of the filter unit. In order to maintain a sufficient collapse strength, the size and number of perforations is limited, so that the center tube may in practice unduly impede the flow of oil therethrough. Additionally, a spring is generally required between the end of the filter element and the closed end of the container, to hold the filter element in position.

In view of the foregoing, replacement of the perforated metal center tube with a helical compression spring has been proposed. The use of a spring disposed axially within the filter element is advantageous in that there is a significantly greater open area for oil to flow through when compared with the conventional perforated center tube, while an even greater collapse strength is provided. However, the ends of such springs are typically sharp, and often damage the inner surface of the paper filter element.

SUMMARY OF THE INVENTION

The present invention relates to a fluid filter comprising an outer container having a closed end and an open end, and an end plate secured within the open end of the container. The end plate is provided with a central fluid outlet port and plural fluid inlet ports disposed around the outlet port. A hollow, cylindrical filter element is enclosed within the container behind the end plate. A combination anti-drainback and relief valve is provided which includes an axially movable cylindrical sleeve, the upper end thereof being disposed within the filter element. The lower end of the sleeve normally engages the end plate radially inwardly of the inlet ports and radially outwardly of the outlet port. A resilient annular lip extends from the sleeve to normally engage the end plate radially outwardly of the inlet ports. Biasing means are disposed within the filter element for normally urging the cylindrical sleeve downwardly into engagement with the end plate.

The force exerted by the biasing means is overcome at a predetermined pressure, at which point the sleeve is moved axially away from the end plate to allow fluid to by-pass the filter element. In addition, the resilient annular seal of the valve operates as an anti-drainback valve to prevent the reverse flow of oil through the filter and out the inlet ports. The novel construction of the present invention thus provides a one-piece, combination anti-drainback and relief valve for a fluid filter.

In a preferred embodiment of the invention, the biasing means comprises a barrel-shaped helical spring disposed within the filter element and having smaller diameter end portions and a larger diameter central portion. The barrel shape of the spring is advantageous in that both of the free ends of the spring, which are typically sharp, are positioned radially inwardly of the inner surface of the filter element, eliminating any of the tearing or other damage the ends might otherwise cause to the pleated paper filter element. Thus, this aspect of the invention may also be advantageously incorporated into filter units provided with conventional anti-drainback valves and separate pressure relief valves, replacing the conventional perforated metal center tube currently used therewith.

BRIEF DESCRIPTION OF THE DRAWING

The above, as well as other advantages of the present invention, will become readily apparent to those skilled in the art from the following detailed description of a preferred embodiment when considered in the light of the accompanying drawings in which.

Figure 4:
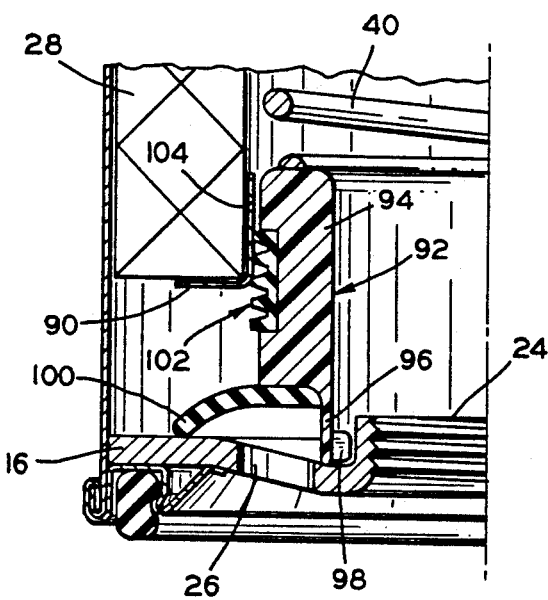
Figure 5:
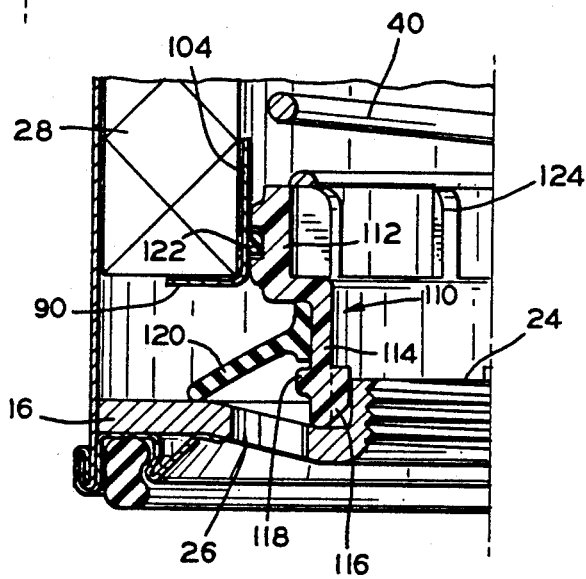
Figure 6:
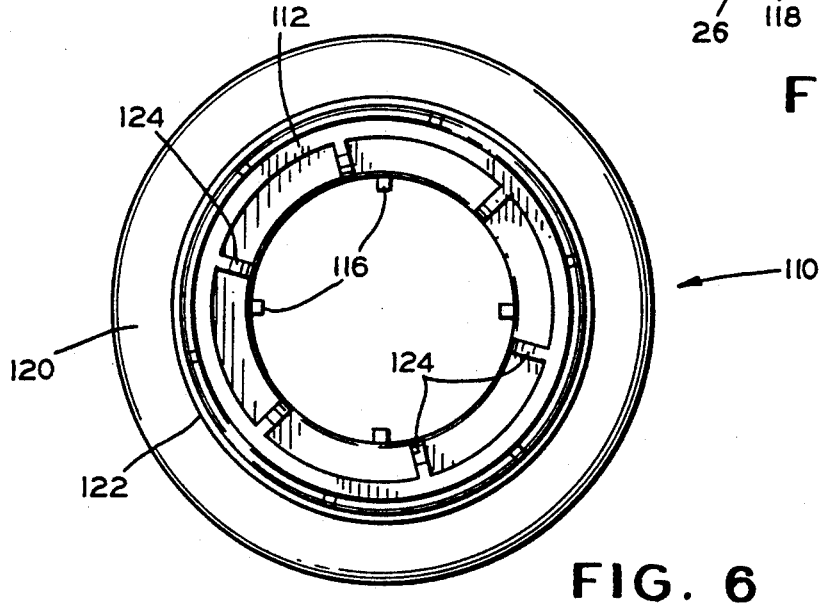
Figure 7:
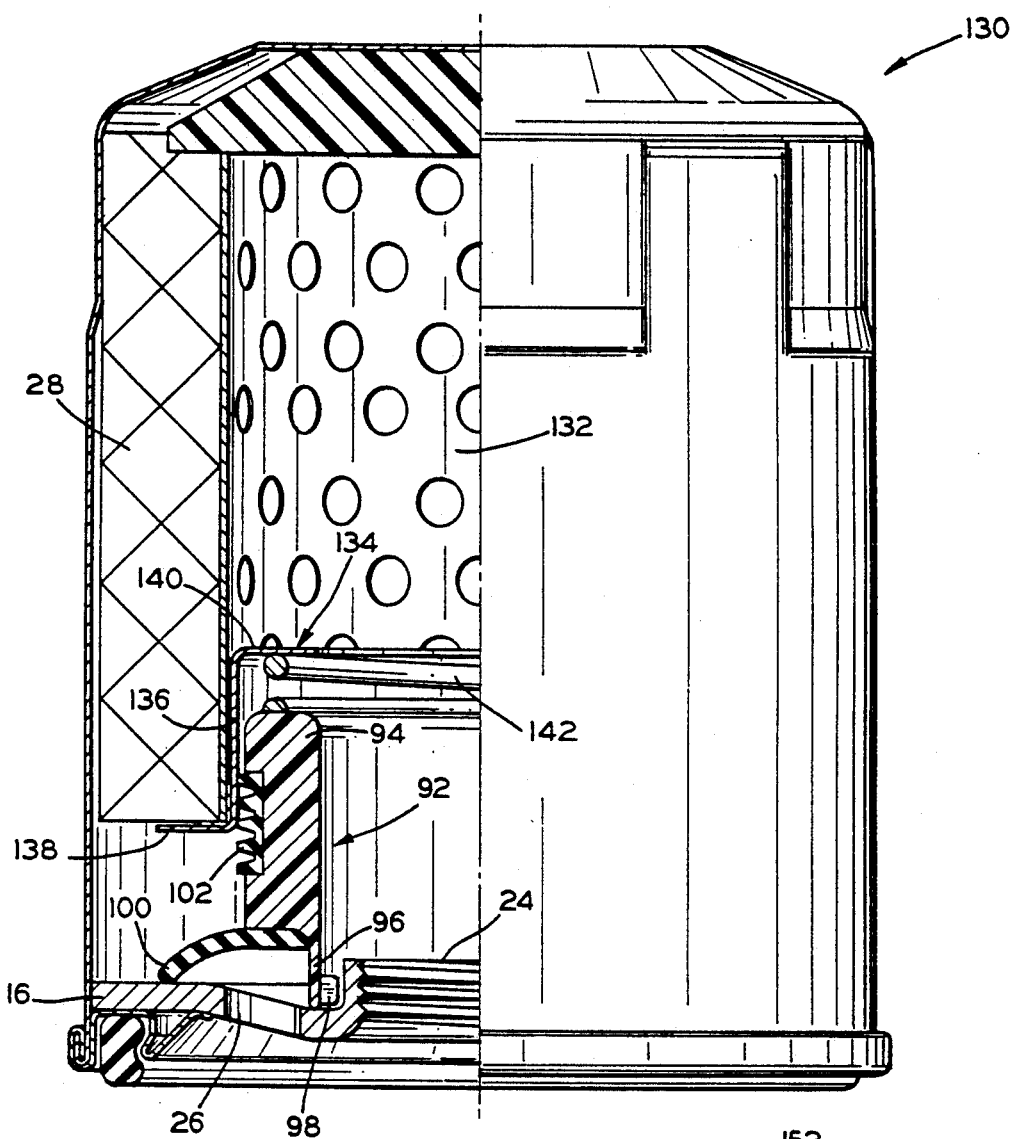
Figure 8:
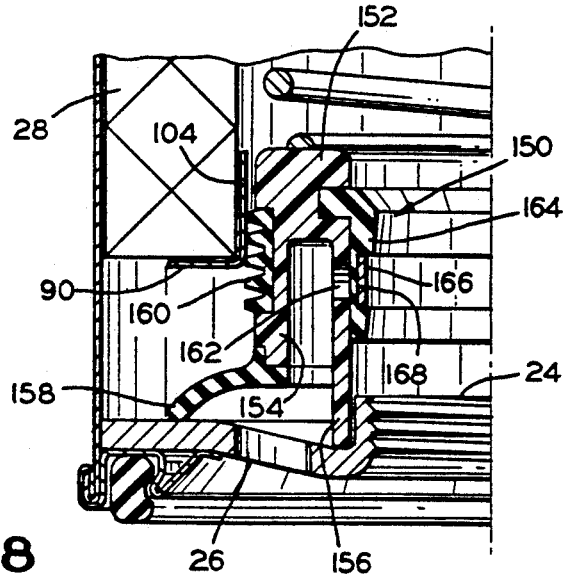

3 in accordance with an aspect of the present invention, and provided with a conventional anti-drainback valve and separate relief valve;

FIG. 4 is a sectional view of an alternate embodiment of a filter unit provided with a one-piece anti-drainback and relief valve in accordance with the present invention;

FIG. 5 is a sectional view of an additional embodiment of a filter unit provided with a one-piece anti-drainback and relief valve in accordance with the present invention;

FIG. 6 is a top end view of the valve shown in FIG. 5;

FIG. 7 is a side elevational view, partially in longitudinal section, of another embodiment of a filter unit including a one-piece anti-drainback and relief valve in accordance with the present invention; and FIG. 8 is a sectional view of an additional embodiment of the one-piece anti-drainback and relief valve of the present invention.

DESCRIPTION OF THE PREFERRED EMBODIMENTS

Figure 1:
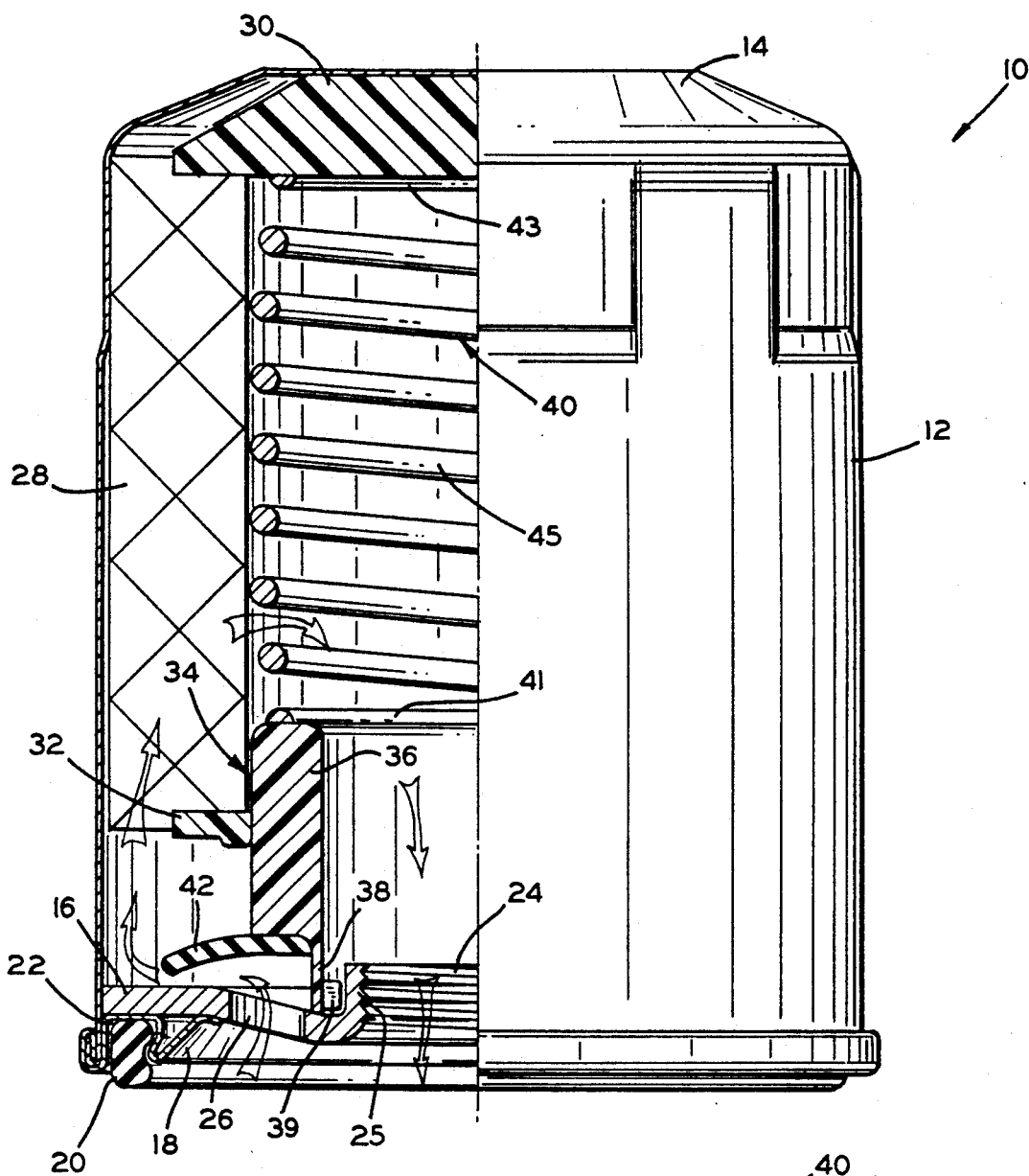
FIG. 1 is a side elevational view, partially in longitudinal section, of a filter unit including a one-piece anti-drainback and relief valve in accordance with the present invention.
Figure 2:
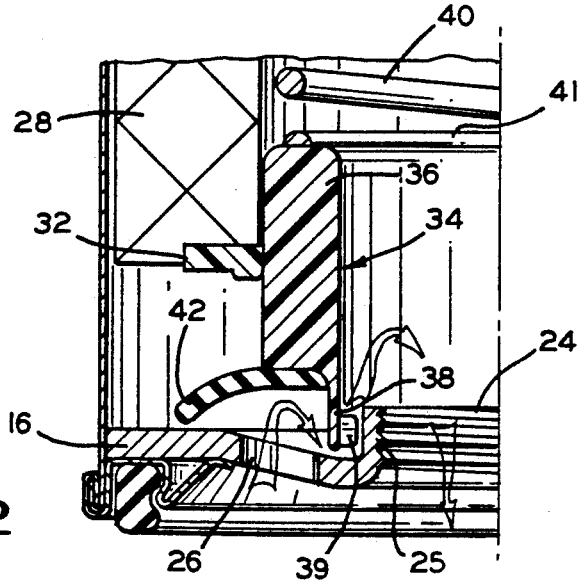
FIG. 2 is a sectional view of a portion of the filter unit illustrated in FIG. 1, showing the combination valve operating as a relief valve.

Referring now to the drawings, there is illustrated in FIGS. 1 and 2 a disposable, spin-on filter unit in accordance with the present invention generally designated by the numeral 10. The filter unit 10 includes an outer housing or container 12 which is closed at one end by an integral end wall 14. The other end of the container 12 is provided with a reinforcing end plate 16 and an annular end cover 18. A gasket 20 formed of an oil resistant elastomeric material, such as nitrile rubber or the like, is disposed within an annular seating recess 22 formed on the lower side of the end cover 18. The gasket 20 is adapted to provide a fluid-tight seal for an oil inlet chamber (not shown) that is formed when the filter unit 10 is operatively mounted on a filter mount of, for example, an internal combustion engine.

The end plate 16 is provided with a centrally located outlet port 24 formed by an internally threaded neck 25 adapted to be screwed onto an externally threaded post or standpipe (not shown) having a central passage for the flow of oil from the filter unit 10 back to the engine. The end plate 16 is also provided with a plurality of inlet ports 26 which allow the oil to be filtered to flow into the interior of the filter unit 10. A hollow, cylindrical filter element 28 formed of conventional resin impregnated pleated paper or other suitable filter material is disposed within the outer container 12. A circular end cap 30 is secured to the end of the filter element 28 adjacent the closed end wall 14 of the container 12 to seal off the upper end of the filter. An annular seal 32, formed of a urethane polymer or other suitable material, is secured to the opposite end of the filter element 28. The annular seal 32 is preferably integrally molded to the end of the filter element 28.

A one-piece, combination anti-drainback and relief valve generally indicated by the numeral 34 is disposed between the filter element 28 and the end plate 16, surrounding the outlet port 24. The valve 34 more particularly comprises a rigid, cylindrical sleeve 36 mounted within the filter element 28 and annular seal 32, and adapted for sliding axial movement relative thereto. The sleeve 36 is of a sufficient length so that the outer periphery thereof maintains a sealing engagement with the annular seal 32 throughout the range of axial sliding movement of the sleeve 36, thereby preventing oil from by-passing the filter element 28 by flowing between the upper end of the sleeve 36 and the filter element 28. The sleeve 36 may be formed of any sufficiently strong, rigid and oil resistant material, and is preferably formed of a moldable polymeric material. It has been found that nylon is one such suitable material.

The lower end of the sleeve 36 terminates in a tubular extension 38 having an outer diameter which is less than the outer diameter of the upper portion of the sleeve 36. The extension 38 is preferably provided with a plurality of circumferentially spaced, radially inwardly projecting tabs 39 which loosely engage the neck 25. The tabs 39 thereby facilitate the orientation of the valve 34 relative to the end plate 16 during assembly of the filter unit 10. A helical compression spring 40 disposed coaxially within the filter element 28 engages the central portion of the end cap 30 and the upper end of the sleeve 36, and normally urges the sleeve 36 downwardly into sealing engagement with the end plate 16 at a position radially inwardly of the inlet ports 26.

The lower end of the of the sleeve 36 also carries an annular, resilient lip 42 formed of a suitable flexible material, such as nitrile rubber, silicone or the like. The lip 42 extends downwardly and radially outwardly from the sleeve 36 to engage the end plate 16 radially outwardly of the inlet ports 26. The lip 42 thus forms a seal with the end plate 16 and prevents flow out of the filter through the inlet ports 26 when the engine is not operating. The resilient lip 42 will disengage from the end plate 16 upon the application of a relatively low pressure created by oil flow through the inlet ports 26 as shown in FIG. 1, and will close when no such pressure is applied. The combination valve 34 may be formed as a one-piece unit by permanently mounting the lip seal 42 to the sleeve 36 with an adhesive, providing a stretch fit, or other suitable means of attachment. Preferably, the entire valve 34 is molded to form a one-piece unit.

During normal operation, oil which enters the filter unit 10 through the inlet ports 26 flows upward and radially outwardly, forcing the distal end of the resilient lip 42 away from the end plate 26 to provide a passage therebetween. The oil flows axially about and through the filter element 28 into a center tube, preferably formed by the spring 40, disposed co-axially within the filter element 28. The spring 40 in that case extends the entire length of the filter element 28 to engage the center portion of the end cap 30. The center tube may also be formed of a conventional perforated metal tube, as discussed in more detail below with reference to FIG. 7. Oil within the spring 40 exits the filter unit 10 through the outlet port 24, flowing back through the central passage in the standpipe to the engine.

As long as the filter element 28 is not unduly clogged, the tubular extension 38 of the cylindrical sleeve 36 will remain in sealing engagement with the end plate 16 due to the force of the spring 40. Should the filter element 28 become sufficiently clogged with contaminants so as to cause a build up of pressure at the inlet ports 26 above a predetermined amount, the force applied to the sleeve 36 by the spring 40 will be overcome, and the sleeve 36 will be moved upwardly from the position shown in FIG. 1 to the position shown in FIG. 2. The extension 38 is thereby disengaged from the end plate 16 to allow the flow of oil around the edge of the extension 38, around and between the tabs 39, and exiting through the outlet port 24. The oil is thereby allowed to by-pass the clogged filter element 28 to supply the necessary oil to the engine parts despite the clogging of the filter element 28. Should the filter element 28 become clogged to an even greater extent, the pressure developed at the inlet ports 26 will be increased, further offsetting the load of the spring 40 to move the end of the extension 38 farther away from the end plate 16. This allows a greater flow of oil to by-pass the filter element 28 in response to an increase in the clogged condition of the filter element 28. Likewise, should there be a reduction in the restriction of the filter element 28 and the pressure caused thereby, the spring 40 will urge the sleeve 36 and extension 38 closer to the end plate 16, reducing the flow of oil by-passing the filter element 28.

The spring 40 is preferably generally barrel shaped, having smaller diameter end portions 41 and 43 and a larger diameter central portion 45. The central portion 45 of the spring 40 exerts forces radially outwardly against the inner surface of the filter element 28 to stabilize and prevent the collapse of the filter element 28 from the high oil pressure developed at the outer periphery of the filter element 28. As noted above, the spring 40 also exerts forces axially between the end wall 13 of the container 12 and the sleeve 36 of the combination anti-drainback and relief valve 34. Forming the spring 40 with the end portion 41 having a diameter less than the diameter of the central portion 45 facilitates the engagement of this end portion 41 against the upper end of the sleeve 36. The spring 40 is also preferably provided with ground ends, both end portions 41 and 43 being substantially flat to further enhance the engagement between the end portions 41 and 43 and the sleeve 36 and end cap 30, respectively.

The barrel shape of the spring 40 is also advantageous in that both of the free ends of the spring, which are typically sharp, are positioned radially inwardly of the inner surface of the filter element 28, eliminating any of the tearing or other damage the ends might otherwise cause to the pleated paper filter element 28. The barrel shaped spring center tube 40 may thus be advantageously used with filter units provided with conventional anti-drainback valves and separate pressure relief valves, replacing the conventional perforated metal center tube currently used therewith. This aspect of the present invention is shown in FIG. 3.

Figure 3:
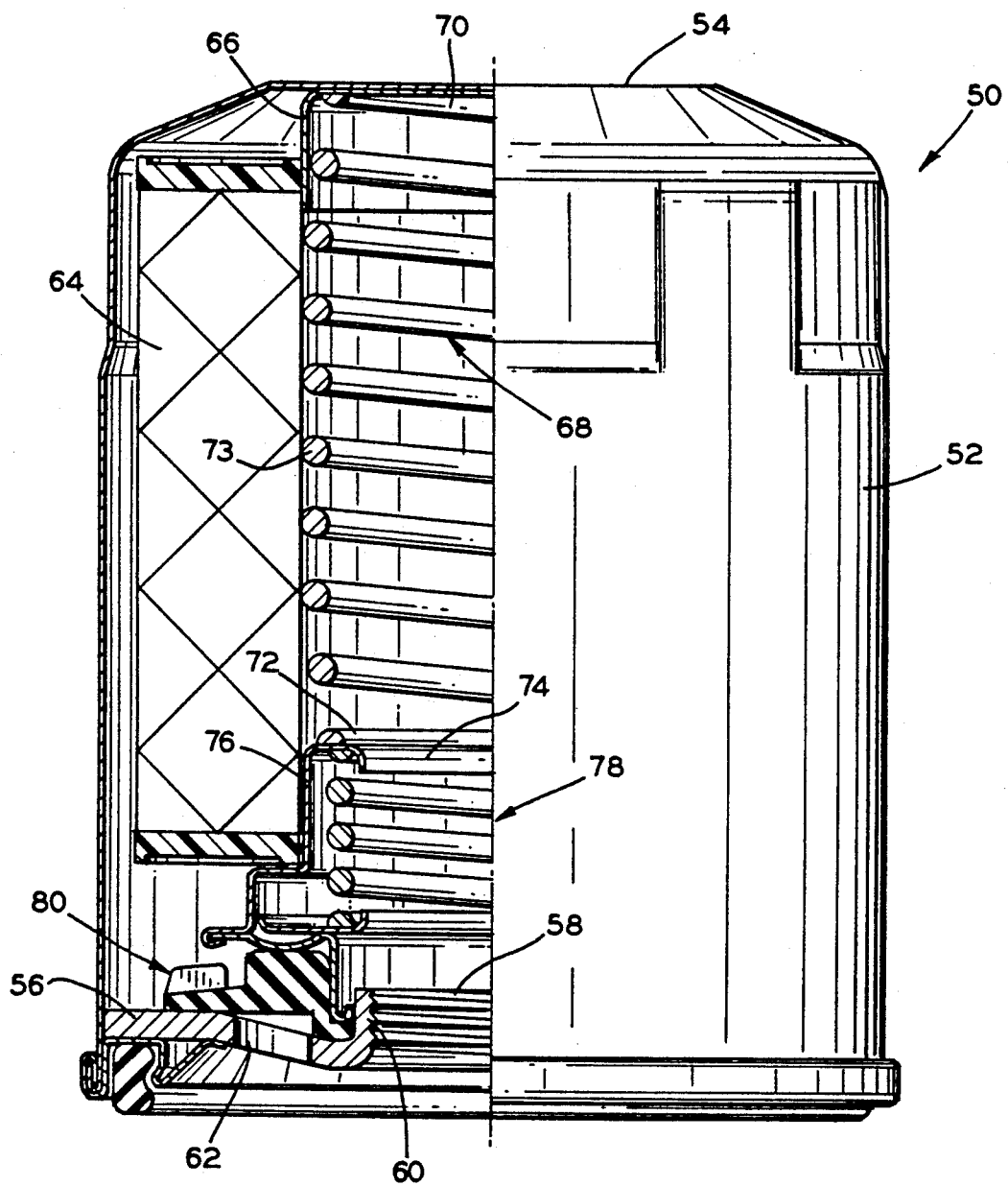
FIG. 3 is a side elevational view, partially in longitudinal section, of a filter unit having a spring center tube

In FIG. 3, the filter unit 50 includes an outer container 52 which is closed at one end by an integral end wall 54. The other end of the container 52 is provided with a reinforcing end plate 56. The end plate 56 is provided with a centrally located outlet port 58 formed by an internally threaded neck 60 adapted to be screwed onto an externally threaded post or standpipe (not shown). The end plate 56 is also provided with a plurality of inlet ports 62 which allow the oil to be filtered to flow into the interior of the filter unit 50. A hollow, cylindrical filter element 64 formed of conventional resin impregnated pleated paper or other suitable filter material is disposed within the outer container 52. A circular end cap 66 is secured to the end of the filter element 64 adjacent the closed end wall 54.

A barrel shaped helical compression spring 68 is disposed within the filter element 64 of the filter unit 50. The spring 68 has smaller diameter end portions 70 and 72 and a larger diameter central portion 73. The upper end 70 of the spring 68 engages the circular end cap 66, which in turn abuts the end wall 54 of the outer container 52. The lower end 72 of the spring 68 engages the upper end 74 of a housing 76 enclosing a conventional pressure relief valve 78. The filter unit 50 is also provided with a conventional separate anti-drainback valve 80 disposed adjacent the end plate 56. By positioning the ends 70 and 72 of the spring 68 radially inwardly of the inner surface of the filter element 64, any tearing or other damage the ends might otherwise cause to the pleated paper filter element 64 is avoided. Additionally, the barrel shape of the spring 68 facilitates the insertion of the spring 68 within the filter element 64 during assembly of the filter unit 50.

In an alternate embodiment of the combination anti-drainback and relief valve of the present invention, illustrated in FIG. 4, a cylindrical sealing element, preferably formed as an L-shaped sleeve 90, is secured to the lower end of the filter element 28 by any suitable means, such as by an adhesive. The L-shaped sleeve 90 may be formed of any sufficiently strong, rigid material having a relatively smooth surface, and is preferably formed of steel. The one-piece, combination anti-drainback and relief valve 92 comprises a rigid, cylindrical sleeve 94 mounted within the filter element 28 and L-shaped sleeve 90, and adapted for sliding axial movement relative thereto. As in the first embodiment of the combination valve, the lower end of the sleeve 94 terminates in a tubular extension 96 which is preferably provided with a plurality of circumferentially spaced, radially inwardly projecting tabs 98. The lower end of the sleeve 94 also carries a resilient lip 100 extending downwardly and radially outwardly from the sleeve 94 to engage the end plate 16 radially outwardly of the inlet ports 26. The lip 100 thus forms a seal with the end plate 16 and prevents flow out of the filter through the inlet ports 26 when the engine is not operating.

The outer surface of the sleeve 94 is provided with an annular seal 102 which sealingly engages the axially extending portion 104 of the L-shaped sleeve 90. The L-shaped sleeve 90 is of sufficient length, and the seal 102 is so positioned, that a sealing engagement is maintained therebetween throughout the range of axial sliding movement of the sleeve 94. The combination valve 92 may be formed as a one-piece unit by permanently mounting the lip seal 100 and the seal 102 to the sleeve 94 with an adhesive or other suitable means of attachment. Preferably, the entire valve 92 is molded to form a one-piece unit.

The seal 102 may be comprised of any suitable elastomeric material, such as a urethane polymer or nitrile rubber, for example. The seal 102 may also be of any suitable construction, such as the multiple lip wiper type seal illustrated in FIG. 4, the O-ring illustrated in FIG. 5 and discussed below, or another suitable seal, such as a series of O-rings, for example.

The valve 92 operates in much the same way as the valve 34 illustrated in FIGS. 1 and 2 and discussed above. The resilient lip 100 will disengage from the end plate 16 upon the application of a relatively low pressure created by oil flow through the inlet ports 26, and will close when no such pressure is applied. Should the filter element 28 become sufficiently clogged so as to cause a build up of pressure at the inlet ports 26 above a predetermined amount, the force applied to the sleeve 94 by the spring 40 will be overcome, and the sleeve 94 will be moved upwardly. The tubular extension 96 is thereby disengaged from the end plate 16 to allow the flow of oil around the edge of tubular extension 96, around and between the tabs 98, and exiting through the outlet port 24, thereby allowing the oil to by-pass the clogged filter element 28. Should there be a reduction in the restriction of the filter element 28 and the pressure caused thereby, the spring 40 will urge the sleeve 94 and tubular extension 96 closer to the end plate 16. During any axial movement of the sleeve 94, the annular seal 102 maintains a sealing engagement with the axially extending portion 104 of the L-shaped sleeve 90 to prevent undesired by-passing of the filter element 28.

Still another embodiment of the combination anti-drainback and relief valve of the present invention is illustrated in FIGS. 5 and 6. A one-piece combination anti-drainback and relief valve 110 is provided which comprises a rigid, cylindrical sleeve 112. The lower end of the sleeve 112 terminates in a tubular extension 114 having an outer diameter which is less than the outer diameter of the upper portion of the sleeve 112. The extension 114 is preferably provided with a plurality of circumferentially spaced, radially inwardly projecting tabs 116 which facilitate the orientation of the valve 110 relative to the end plate 16 during assembly of the filter unit.

The outer surface of the extension 114 is provided with an annular flange 118. An annular, resilient lip 120, formed of a suitable material such as nitrile rubber, silicone or the like, may be stretch fitted around the extension 114, disposed above the flange 118. The lip 120 extends downwardly and radially outwardly from the sleeve 112 to engage the end plate of the filter unit radially outwardly of the inlet ports. The lip 120 thus acts as an anti-drainback valve, forming a seal with the end plate and preventing flow out of the filter through the inlet ports when the engine is not operating.

The outer surface of the sleeve 112 is provided with an annular seal 122, such as the O-ring shown in FIG. 5. The O-ring 122 sealingly engages an axially extending surface adjacent the inner surface of the cylindrical filter element, in much the same manner as the annular seal 102 of the embodiment of FIG. 4 sealingly engages the axially extending portion 104 of the L-shaped sleeve 90 of that embodiment. The valve 110 operates as a pressure relief in the same manner as the valves of the embodiments described above.

In this embodiment, the sleeve 112 is preferably provided with a plurality of circumferentially spaced, radially inwardly projecting ribs 124. The ribs 124 provide a sufficient engaging surface for a spring center tube, such as the spring 40 shown in the embodiments of FIGS. 1, 2 and 4, while allowing a reduction in the amount of material used to form the sleeve 112. The sleeve 112 is provided with at least three (3) radial supports, and is preferably provided with six (6) spaced ribs 124 as shown in FIG. 6.

In the embodiment shown in FIG. 7, a combination anti-drainback and relief valve of the present invention is utilized in a filter unit 130 including a conventional perforated metal center tube 132. The valve 92 is identical to that shown in FIG. 4, and the same reference numerals are used to designate the elements thereof.

A generally Z-shaped sleeve 134 is secured to the lower end of the filter element 28 in place of the L-shaped sleeve 90 of the embodiment shown in FIG. 4. The Z-shaped sleeve 134 includes an axially extending central portion 136, an annular flange 138 extending radially outwardly from the lower end of the sleeve 134, and an annular flange 140 extending radially inwardly from the upper end of the sleeve 134.

A spring 142, such as a helical compression spring or a wave spring or the like, disposed coaxially within the filter element 28 engages the inwardly extending flange 140 and the upper end of the sleeve 94, and normally urges the sleeve 94 downwardly into sealing engagement with the end plate 16 at a position radially inwardly of the inlet ports 26. The valve 92 operates in the same manner as in the embodiments discussed above, but may thereby be used with the conventional perforated metal center tube 132.

In still another embodiment of the invention, illustrated in FIG. 8, a one-piece combination anti-drainback and relief valve 150 is provided. As with the embodiment shown in FIG. 4, an L-shaped sleeve 90 is secured to the end of the filter element 28 by any suitable means, such as by an adhesive.

The valve 150 comprises a rigid, cylindrical sleeve 152 mounted within the filter element 28 and L-shaped sleeve 90, and adapted for sliding axial movement relative thereto. The lower end of the sleeve 150 terminates in a pair of radially spaced, tubular extensions 154 and 156. The lower end of the outer extension 154 carries a resilient lip 158 extending downwardly and radially outwardly therefrom to engage the end plate 16 radially outwardly of the inlet ports 26.

The outer surface of the sleeve 150 is provided with an annular seal 160 which sealingly engages the axially extending portion 104 of the sleeve 90. The axially extending portion 104 is of sufficient length, and the seal 160 is so positioned, that a sealing engagement is maintained therebetween throughout the range of axial sliding movement of the sleeve 150. The seal 160 may be comprised of any suitable material, such as nitrile rubber, silicone or the like, and may also be of any suitable construction, such as an O-ring, a series of O-rings, or the multiple lip wiper type seal illustrated in FIG. 8.

Normally, the spring 40 urges the sleeve 152 downwardly so that the end of the inner extension 156 sealingly engages the end plate 16 at a position radially inwardly of the inlet ports 26. Additionally, the inner extension 156 is provided with a plurality of radially oriented, circumferentially spaced relief ports 162. Oil is normally blocked from flowing through the relief ports 162 by an annular, resilient internal lip seal 164 secured to the inner surface of the sleeve 152. Should the filter element 28 become sufficiently clogged so as to cause a build up of pressure above a predetermined amount, the internal lip seal 164 will be deformed radially inwardly, allowing the flow of oil through the relief ports 162 and exiting through the outlet port 24, thereby allowing the oil to by-pass the clogged filter element 28.

Thus, in this embodiment, the valve 150 is capable of acting as a relief valve without requiring axial movement of the sleeve 152. The sleeve 152 is, however, still adapted to slide axially within the filter element 28 and L-shaped sleeve 90 if and when the pressure builds to the point that the force of the spring 40 is overcome, since the pressure required to overcome the flexible internal seal 164 is less than that required to overcome the force of the spring 40. Accordingly, should the pressure increase to unacceptable levels despite the by-passing of oil through the relief ports 162, the sleeve 152 will be moved upwardly so that the inner extension 156 is disengaged from the end plate 16. This allows oil to flow around the edge of the inner extension 156 and exit through the outlet port 24, permitting additional oil to by-pass the clogged filter element 28.

The combination valve 150 may be formed as a one-piece unit by permanently mounting the lip seal 158, the seal 160, and the internal lip seal 164 to the sleeve 152 with an adhesive or other suitable means of attachment. Preferably, the entire valve 150 is molded to form a one-piece unit.

In some applications, where the desired pressure at which the relief valve is activated is relatively high, an additional reinforcing spring 166 may be required. The reinforcing spring 166 is disposed within an annular groove 168 formed on the radially inwardly facing surface of the internal seal 164, opposite the relief ports 162. The spring 166 exerts a force radially outwardly to urge the internal lip seal 164 against the inner extension 156. A greater pressure is thus required to overcome the reinforcing spring 166, as well as the internal lip seal 164 itself, before oil will be permitted to flow through the relief ports 162 and by-pass the filter element 28.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A fluid filter comprising:
   a. an outer container having a central axis, a closed end and an open end;
   b. an end plate secured within the open end of said container, said end plate having a central fluid outlet port and plural fluid inlet ports disposed around the outlet port;
   c. a hollow, cylindrical filter element enclosed within said container and said end plate;
   d. a one-piece, combination anti-drainback and relief valve including:
      i. a cylindrical sleeve movable along the central axis of said container with respect to said end plate, one end thereof being disposed within said filter element, and the other end thereof terminating in a pair of radially spaced, inner and outer tubular extensions, the distal end of said outer extension being spaced from said end plate and the distal end of said inner extension normally engaging said end plate at a position radially inwardly of said inlet ports, said inner extension including a plurality of radially oriented, circumferentially spaced relief ports in communication with said fluid outlet port, wherein said relief ports are normally blocked by an annular, resilient internal lip seal secured to the inner surface of said sleeve, so that when the pressure at said inlet ports exceeds a predetermined amount, said internal lip seal will be deformed radially inwardly, allowing the flow of fluid through said relief ports and exiting through said outlet port; and
      ii. a resilient annular lip extending from the outer extension of said sleeve to normally engage the end plate radially outwardly of said inlet ports; and
   e. biasing means disposed within said filter element for normally urging the cylindrical sleeve of said valve into engagement with said end plate.

2. A fluid filter as defined in claim 1, wherein said biasing means comprises a helical compression spring disposed within said filter element and having one end thereof positioned adjacent said sleeve.

3. A fluid filter as defined in claim 2, wherein the diameter of one of the end portions of said spring is smaller than the diameter of the central portion thereof.

4. A fluid filter as defined in claim 3, wherein the end of said spring adjacent said sleeve is substantially flat to enhance the engagement between said end of said spring and said sleeve.

5. A fluid filter as defined in claim 3, wherein the diameter of both end portions of said spring are smaller than the diameter of the central portion thereof.

6. A fluid filter as defined in claim 1, wherein the sleeve of said valve is formed of a moldable polymeric material.

7. A fluid filter as defined in claim 6, wherein said sleeve is formed of nylon.

8. A fluid filter as defined in claim 1, wherein a cylindrical sealing element is secured to said filter element, and an elastomeric annular seal is secured to said sleeve, said elastomeric annular seal sealingly engaging said cylindrical sealing element throughout the range of axial movement of said sleeve.

9. A fluid filter as defined in claim 8, wherein said elastomeric, annular seal is comprised of a multiple lip, wiper type seal.

10. A fluid filter as defined in claim 1, wherein said sleeve and said lip seal are integrally molded to form a one-piece valve.

11. A fluid filter as defined in claim 1, wherein said valve further comprises a reinforcing spring disposed within an annular groove formed on the radially inwardly facing surface of said internal lip seal and opposite said relief ports, said reinforcing spring exerting a force radially outwardly to urge said internal lip seal against the inner extension of said sleeve.

* * * * *